(12) United States Patent
de Goycoechea et al.

(10) Patent No.: US 11,711,703 B2
(45) Date of Patent: Jul. 25, 2023

(54) ANTENNA MONITORING SYSTEM FOR DISTRIBUTED ANTENNA SYSTEMS

(71) Applicants: Ricardo Matias de Goycoechea, Cordoba (AR); Emanuel Melman, Boca Raton, FL (US)

(72) Inventors: Ricardo Matias de Goycoechea, Cordoba (AR); Emanuel Melman, Boca Raton, FL (US)

(73) Assignee: Fiplex Communications, Inc., Miami, FL (US)

( * ) Notice: Subject to any disclaimer, the term of this patent is extended or adjusted under 35 U.S.C. 154(b) by 168 days.

(21) Appl. No.: 17/111,026

(22) Filed: Dec. 3, 2020

(65) Prior Publication Data
US 2021/0168627 A1    Jun. 3, 2021

Related U.S. Application Data

(60) Provisional application No. 62/943,205, filed on Dec. 3, 2019.

(51) Int. Cl.
*H04W 24/02* (2009.01)
*H04B 17/30* (2015.01)

(52) U.S. Cl.
CPC ............ *H04W 24/02* (2013.01); *H04B 17/30* (2015.01)

(58) Field of Classification Search
CPC ... H04W 24/02; H04W 24/04; H04W 88/085; H04W 52/245; H04W 24/08; H04W 24/10; H04B 17/30; H04B 17/103; H04B 17/16; H04B 17/17; H04B 17/318; H04B 1/3827; H04B 17/102; H04B 17/12
See application file for complete search history.

(56) References Cited

U.S. PATENT DOCUMENTS

| | | | |
|---|---|---|---|
| 9,740,897 B1* | 8/2017 | Salour | G06K 7/10316 |
| 10,128,968 B2* | 11/2018 | Muakkit | H04B 7/18519 |
| 2008/0211431 A1* | 9/2008 | Mishin | H05H 7/12 315/505 |
| 2012/0309328 A1* | 12/2012 | Morrison | H04W 88/085 455/78 |
| 2012/0322501 A1* | 12/2012 | Abouzid | G01S 13/876 235/492 |

(Continued)

*Primary Examiner* — Lana N Le
(74) *Attorney, Agent, or Firm* — The Brickell IP Group, PLLC; Rafael Perez-Pineiro

(57) ABSTRACT

A communication system includes a signal source for transmitting downlink signals and receiving uplink signals to and from an indoor signal coverage area; and a distributed antenna system interposed between the signal source and the indoor signal coverage area. The distributed antenna system includes an antenna monitoring unit connected to at least one service antenna through a distribution network. The at least one antenna transmits and receives the downlink signals and the uplink signals to and from at least one terminal unit within the indoor coverage area. The antenna monitoring unit includes an RFID transceiver that communicates with at least one RFID tag attached to the at least one antenna and detects the location of a point of anomaly with respect to that one antenna when a signal from the at least one RFID tag is not received by the RFID transceiver, or when a power level measured by the RFID tag and reported back to the RFID transceiver falls below a predetermined threshold level.

4 Claims, 10 Drawing Sheets

(56) References Cited

U.S. PATENT DOCUMENTS

| | | | |
|---|---|---|---|
| 2014/0043168 A1* | 2/2014 | Schaible | G08B 21/18 |
| | | | 340/686.6 |
| 2014/0192849 A1* | 7/2014 | Terry | H04W 24/02 |
| | | | 375/259 |
| 2015/0136760 A1* | 5/2015 | Lima | H05B 6/686 |
| | | | 219/709 |
| 2017/0237484 A1* | 8/2017 | Heath | H04W 24/08 |
| | | | 398/26 |
| 2020/0021508 A1* | 1/2020 | Kim | H04L 41/147 |
| 2020/0274626 A1* | 8/2020 | Leaf | H01Q 21/28 |

\* cited by examiner

ANTENNA MONITORING SYSTEM FOR DISTRIBUTED ANTENNA SYSTEMS

CROSS REFERENCE TO RELATED APPLICATIONS

This application claims the benefit of U.S. Provisional Application No. 62/943,205 filed Dec. 3, 2019, the disclosure of which is hereby incorporated herein by reference in its entirety.

FIELD OF THE INVENTION

Embodiments of the present invention generally relate to a system and method for monitoring the operational condition of antennas in a radio distribution network of a Distributed Antenna System ("DAS").

BACKGROUND

When transmission or retransmission of radio frequency (RF) signals is desired, such as signals from cellular networks, WiFi, LTE systems, public safety systems, and others, inside or within a specific area or location such as building, an underground subway station, a basement, a parking lot, a stadium, and others, a signal source is used to transmit the RF signals. These signal sources include, for example, a Base Transceiver Station (BTS), a Small Cell, a Signal Booster (or BDA or Repeater), a Fiber DAS (distributed antenna system), and/or an equivalent signal source. The output port or ports of the signal source are connected to a radio distribution network which may be defined as an arrangement of passive elements (power splitters, couplers, circulators, etc.) that are used to distribute signals to antennas positioned throughout the specific area, for example, the interior of a building.

The connection between the signal source and the antennas can be implemented through a distribution network that can include physical and/or wireless connections, and the signal distribution network may or may not use splitters or couplers to distribute the signals to each antenna. In this manner, the signals generated or amplified by the signal source are received and radiated by the antennas to provide radio frequency ("RF") coverage in all of the areas of the desired or specific area, enabling Downlink communication (from the signal source to the terminal units ("TUs")) of the signals from the source to all terminal units located in that specific area or space. The terminal units may include cell phones, tablets, IoT devices, walkie talkies, or other receiver or transceiver device that can communicate using one or more of the RF signals from the signal source.

FIG. 1 illustrates a known radio communication system including a signal source 101, a transmission line 103, an antenna port or connector 105, an antenna 107, and a terminal unit 109. In the Uplink direction (from the terminal units to the signal sources), the antennas, that are distributed throughout the specified or desired area or space, receive the signals that are emitted or transmitted by the terminal units, and through use of the same distribution network that allows communication in the Downlink direction, these signals transmitted by the TUs reach the signal source, which allows communication to be established between the TUs and the signal source in the Uplink direction.

A problem experienced by all of these systems relates to the inability of the signal sources and of the administrators of such radio communication systems to determine if any of the antennas (e.g., an antenna inside a building) has been disconnected or damaged, or if the functionality of the antenna has been altered in any manner. In general, signal sources may have the capability of determining whether the distribution network has been disconnected, but they are not fully aware and do not have the capability to control or monitor the operational status of the devices at the other end of the distribution network. For example, the signal sources cannot control or monitor the operation or performance of antennas distributed inside a building.

The use of signal boosters as signal sources in a public safety application serves to illustrate the problem with the prior art. FIG. 2 illustrates a known radio communication system with a point of anomaly. A signal booster or source (illustrated as a signal source 201) may be equipped with incident and reflected power meters, such that in the event that the coaxial connector coupled to the output port of the signal booster becomes disconnected, the power meter can detect reflected power, which would mean that due to a no load condition (e.g., open port) or mismatched impedance, the signal power is being reflected and returned to the signal booster through the transmission line 203. The detection of the reflected power would indicate that there is an operational malfunction within the distribution network (e.g., there is a fault or point of anomaly such as a short circuit 213), which allows the signal booster to generate an alarm, for example a VSWR alarm, to alert the system administrator that the distribution network is not operating properly and that there will be potential problems with the emission of radio signals all over the entire area of interest, and consequently, that TUs may be left without coverage by not establishing a proper link with the signal booster.

FIG. 3 illustrates a known radio communication system with a point of anomaly and experiencing loss of signal due to transmission line attenuation. FIG. 3 shows a signal booster being used as a signal source 301, a long transmission line 303, and a point of anomaly 313 (e.g., a short circuit). Now, detection of reflected signal power is directly linked to the attenuation experienced by the signal from the time it is reflected (reflection may be generated by a disconnection of the coaxial cable, by an impedance problem/mismatch in the transmission line, or by a short circuit) until the time the reflected signal is received by the power meter in the signal booster. When the reflection occurs at the output connector of the signal booster (for example, if someone disconnects the coaxial output connector of the signal booster), the reflection is measured without any attenuation and is easily detectable. On the other hand, if the reflection occurs along a certain stretch of the transmission line, for example by an impedance mismatch at some point inside a coaxial cable, then the reflected signal returns back from the coaxial cable to the signal booster. If the reflected signal, as it makes its way back to the signal booster, is attenuated as a result of the travel distance between the point of reflection and the signal booster (which is almost if not always the case, as all transmission lines introduce losses that translate into attenuation of the signals), then it can be very difficult for the signal booster to detect such reflected signal, which means that in effect the signal booster loses its ability to detect anomalies in the distribution network.

FIG. 4 illustrates a known radio communication system including a signal booster used as a signal source 401, a transmission line 403, a power splitter 415, an operational antenna 407, and a point of anomaly 413. The ability to detect points of anomaly is further impaired when the distribution network includes coaxial cables, signal splitters or signal couplers, which are components used to split signals and feed them to two or more coaxial cables, because these signal splitting components (e.g., power splitters, couplers, taps, etc.) further attenuate the signals (both incident and reflected signals) and because due to their design or manufacture, they oftentimes absorb the signals after the signals are reflected and returned back to the splitting device output port. As a result of the use of these splitting components, the signal reflected from a point of anomaly is prevented from ever reaching the signal booster, preventing the signal booster from detecting anomalies beyond the splitting or signal coupling components.

Another problem with indoor distribution systems is the inability to determine the location of the TUs. When a TU transmits an uplink ("UL") signal, that signal is received by at least one of the indoor antennas, it travels through the distribution network to the signal source, as all the UL signals received by all the indoor antennas do, which makes the signal source unable to determine where a particular TU is located within the specific coverage area. By contrast, in a scenario where the intended coverage area is outdoors, many signal sources may receive the same UL signal from a specific TU and an analysis of power received from the TU can be performed in the time domain, which means that it would be possible to determine the location of a TU located outdoors through dimensional analysis.

There are different solutions to provide indoor location of the TUs, but those solutions require the installation of software or firmware on the TU so that the TU can send specific information to the signal source, which might then be used to provide a dimensional location of the TU. Other solutions to provide indoor location of the TUs require the installation of additional hardware in the TU and/or at the indoor location, such as but not limited to, RFID, beacons and others, which provides the signal source with the ability to provide a dimensional location of the TU based on information received from the additional hardware. All of the present solutions require additional software and/or firmware and/or hardware to be incorporated at or with the Terminal Unit, or hardware installed at the indoor area for the Terminal Unit to interact with the hardware.

A brief description of solutions that have been applied to the problem of detecting anomalies that may exist in the signal distribution systems follows. A first existing solution is the placement of VSWR alarms at the signal source output. This existing method is the most basic for detecting anomalies in the signal distribution network (distribution network, antennas, splitters, couplers, etc.) and it is limited by the attenuation experienced by the signals when reflected from the point of anomaly (broken coaxial cable, unplugged connector, antenna disconnected or damaged, short circuit, among others) until they reach the output port of the signal source. See FIG. 3.

A second existing solution implements granularity of the signal sources. With the goal of being able of exerting better control over each indoor antenna (and monitoring each antenna), and with the objective of obviating the losses that are introduced by the distribution networks, among other improvements, another existing solution involves providing signal sources with a higher level of granularity, meaning that each signal source manages a very small number of antennas which are connected to the signal source through very short paths of distribution media (e.g., short jumpers of coaxial cable), allowing any reflected signal to be detected by the signal source. The problem with this alternative existing solution is that it requires installation of a large number of signal sources, which causes a negative impact on the overall cost of the system, making this solution unviable for many systems. This solution is illustrated in FIG. 5, which shows a side by side comparison of a more conventional radio distribution network having a signal source 501, several power splitters 515 and indoor antennas 507, with a granular system having each signal source from the set of signal sources 521 connected to a corresponding antenna in the set of antennas 527 through short paths.

A third existing solution involves positioning couplers and/or other devices or components within the passive distribution network to monitor the VSWR reflected from the antennas. In this case many units are placed within the distribution network to constantly measure the VSWR of the cables and antennas. One limitation of this solution is that measuring the VSWR only provides an indication of how the network impedance is compensated, but does not reveal any information related to modifications or changes to the distribution network that result in changes to the signal propagation indoors. For example, if a third party replaces a original coaxial cable or transmission line in the distribution network for another transmission line with the same characteristic impedance but with different attenuation specifications, then the VSWR may not change and may not be indicative of any problems within the distribution network, the new additional losses introduced in the distribution network (due to the new transmission line attenuation specifications) may cause the signals to be further attenuated, affecting the resulting propagation of signals at the indoor location, which would also constitute a failure of the system.

A fourth existing solution involves connecting or embedding devices with antennas which detect through use of RFID, current sensing, current consumption, among others, if the antennas are connected to the passive distribution network. This type of solution allows the system owner or administrator to verify that all antennas are connected, but the disadvantage of these systems is that they do not provide an indication of VSWR or changes in the network and/or faults that modify the indoor propagation pattern.

With respect to a determining the location of a terminal unit positioned indoors, some solutions are based on specific software and/or firmware and/or hardware installed on the TU and/or the indoor location, wherein such software/firmware/hardware reads TU information such as, but not limited to, GPS location, and determines whether such information is transmitted to the signal source for dimensional location calculations. The limitation of these solutions is that their effectiveness depends on such software and/or firmware and/or hardware installed on the TU and/or at the indoor location, which increases the cost of the overall system and makes the system less fault tolerant, as the system performance will be dependent on additional system variables, reducing the system reliability. Further, in some cases these type of systems are limited in terms of performance due to the limited availability of external information, such as but not limited to, GPS signals present in the indoor location of the TU.

Therefore, in view of these disadvantages, there is a need in the art for an improved system and method to detect and report the location of points of anomaly of a radio distribution network of a radio communication system and to detect the location of terminal units within an indoor coverage area.

SUMMARY

The following presents a simplified summary of the invention in order to provide a basic understanding of some aspects of the invention. This summary is not an extensive overview of the invention. Rather than specifically identifying key or critical elements of the invention or to delineate the scope of the invention, its purpose, inter alia, is to present some concepts of the invention in a simplified form as a prelude to the more detailed description that is presented later.

The present disclosure relates to the detection of points of anomaly in a radio communications system and to the determination of the location of terminal units within an indoor signal coverage area. In an exemplary implementation of the present disclosure, a communication system may include a signal source for transmitting downlink signals and receiving uplink signals to and from an indoor signal coverage area; and a distributed antenna system interposed between the signal source and the indoor signal coverage area. The distributed antenna system includes an antenna monitoring unit connected to at least one service antenna through a distribution network. The at least one antenna transmits and receives the downlink signals and the uplink signals to and from at least one terminal unit within the indoor coverage area. The antenna monitoring unit includes an RFID transceiver that communicates with at least one RFID tag attached to the at least one antenna and detects the location of a point of anomaly with respect to that one antenna when a signal from the at least one RFID tag is not received by the RFID transceiver, or when a power level measured by the RFID tag and reported back to the RFID transceiver falls below a predetermined threshold level.

The following description and the annexed drawings set forth in detail certain illustrative aspects of the invention. These aspects are indicative, however, of but a few of the various ways in which the principles of the invention may be employed and the present invention is intended to include all such aspects and their equivalents. Other advantages and novel features of the invention will become apparent from the following description of the invention when considered in conjunction with the drawings.

BRIEF DESCRIPTION OF THE DRAWINGS

The drawings, in which like numerals represent similar parts, illustrate generally, by way of example, but not by way of limitation, various embodiments discussed in the present document.

DETAILED DESCRIPTION

The foregoing summary, as well as the following detailed description of certain embodiments of the subject matter set forth herein, will be better understood when read in conjunction with the appended drawings. In the following detailed description, reference is made to the accompanying drawings which form a part hereof, and in which are shown by way of illustration specific embodiments in which the subject matter disclosed herein may be practiced. These embodiments, which are also referred to herein as "examples," are described in sufficient detail to enable those skilled in the art to practice the subject matter disclosed herein. It is to be understood that the embodiments may be combined or that other embodiments may be utilized, and that variations may be made without departing from the scope of the subject matter disclosed herein. It should also be understood that the drawings are not necessarily to scale and in certain instances details may have been omitted, which are not necessary for an understanding of the disclosure, such as details of fabrication and assembly. Furthermore, references to "one embodiment" are not intended to be interpreted as excluding the existence of additional embodiments that also incorporate the recited features. The following detailed description is, therefore, not to be taken in a limiting sense, and the scope of the subject matter disclosed herein is defined by the appended claims and their equivalents.

Figure 1:
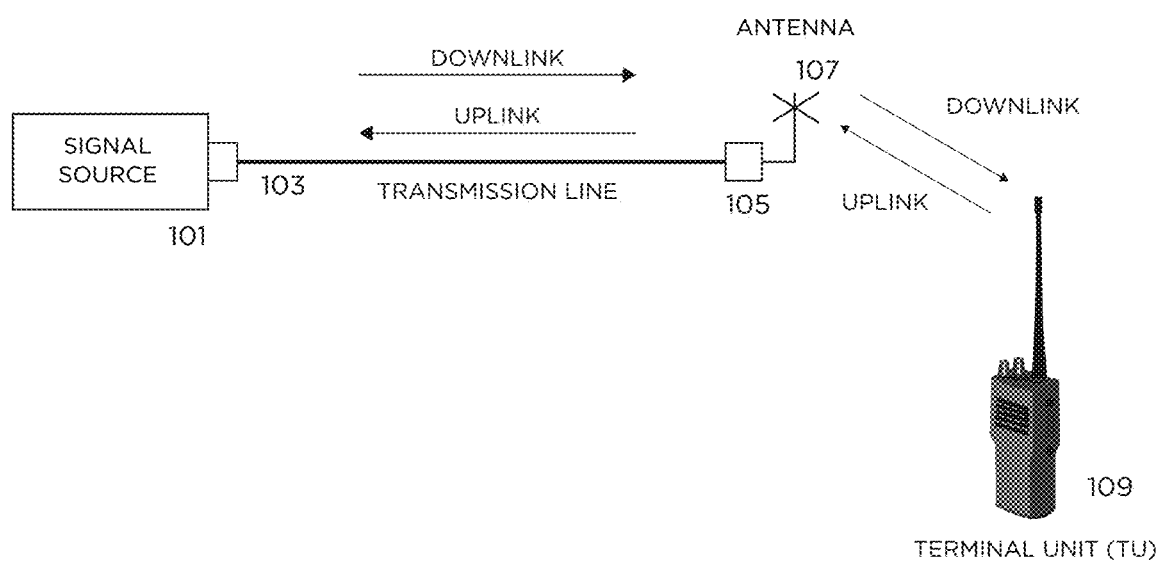
FIG. 1 illustrates a known radio communication system including a signal source, a transmission line, an antenna, and a terminal unit.
Figure 2:
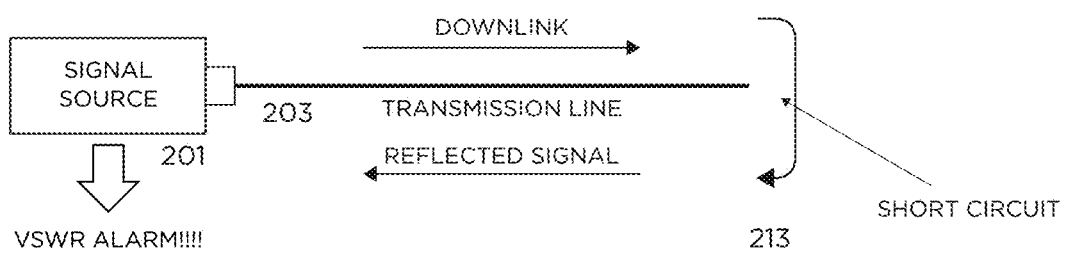
FIG. 2 illustrates a known radio communication system with a point of anomaly.
Figure 3:
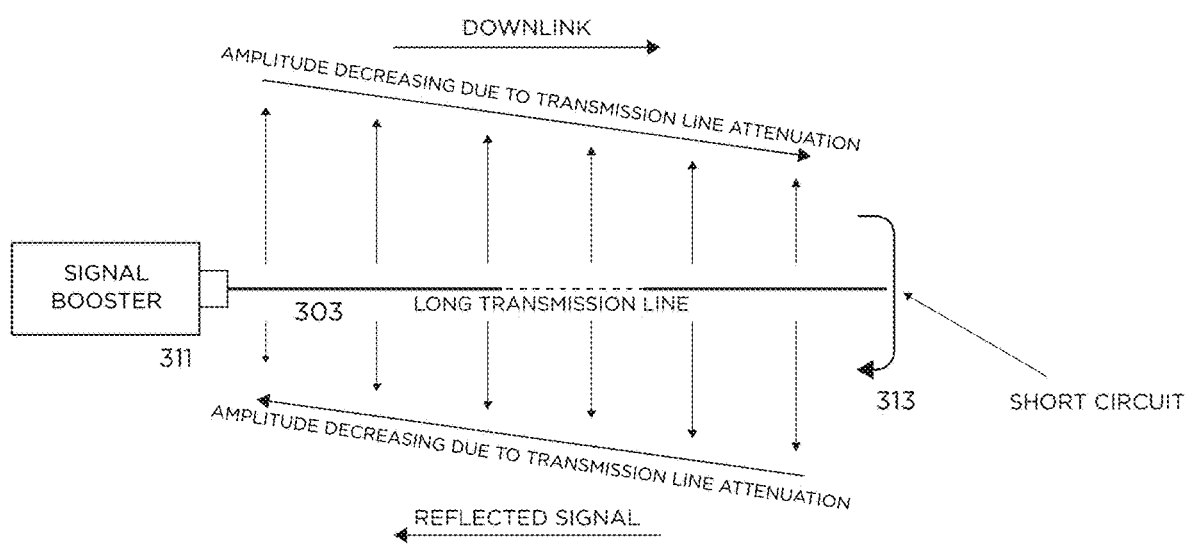
FIG. 3 illustrates a known radio communication system with a point of anomaly and experiencing loss of signal due to transmission line attenuation.
Figure 4:
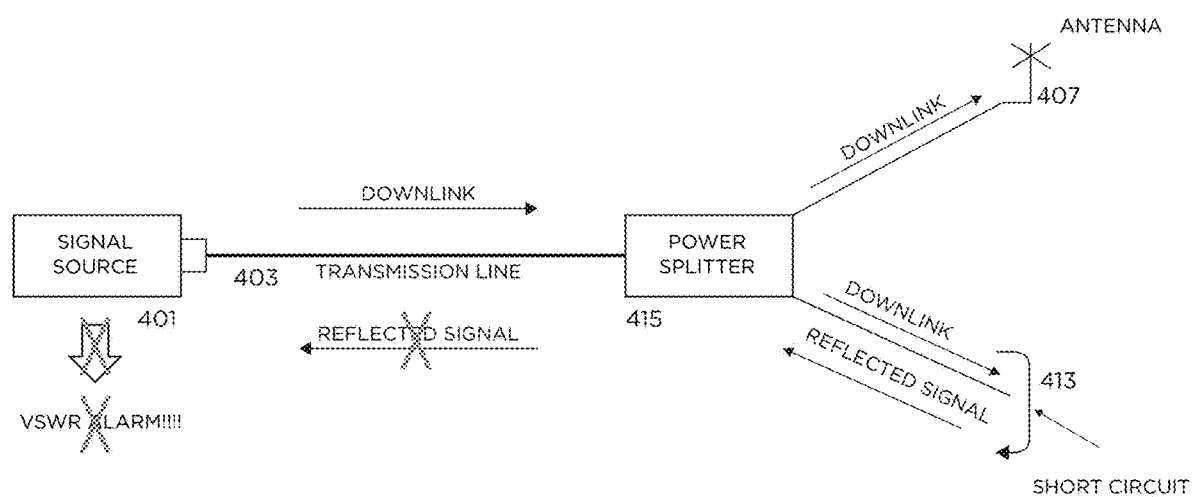
FIG. 4 illustrates a known radio communication system including a signal source, a transmission line, a power splitter, an operational antenna, and a point of anomaly.
Figure 5:
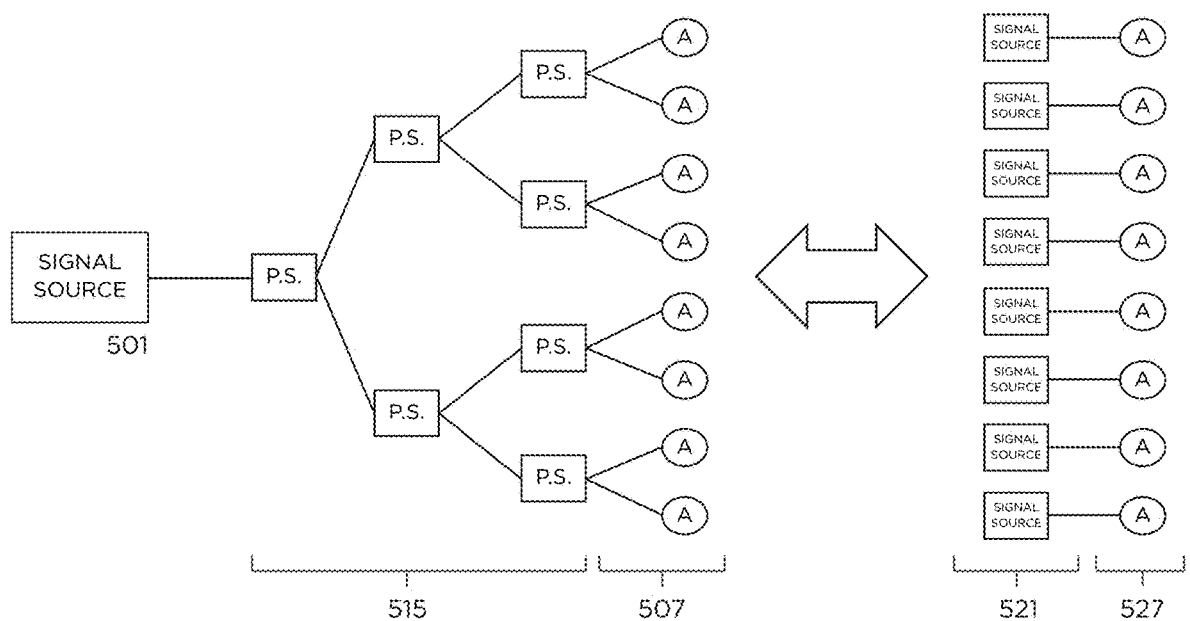
FIG. 5 illustrates a known radio communication system short paths of signal distribution.
Figure 6:
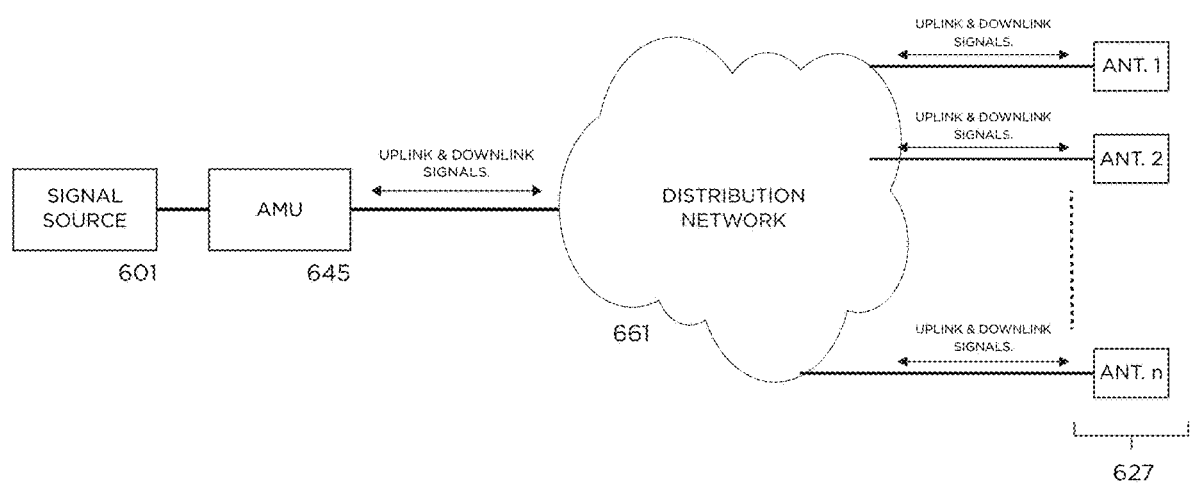
FIG. 6 illustrates a radio communication system with an antenna monitoring unit connected in between a signal source and a signal distribution network in accordance with one exemplary implementation of the disclosure.
Figure 8:
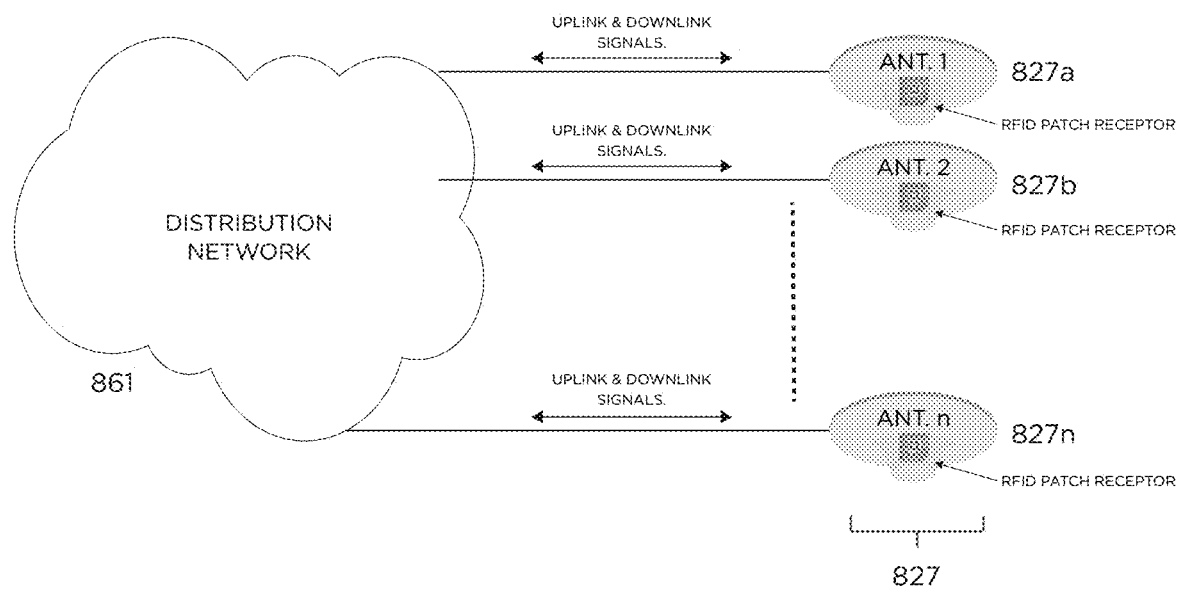
FIG. 8 illustrates a radio communication system with a passive distributed antenna system terminated with antennas with RFID patch receptors in accordance with one exemplary implementation of the disclosure.

The present disclosure describes a system that solves the problems with the prior art. FIG. 6 illustrates a radio communication system in accordance with one implementation. Referring to FIG. 6, one exemplary implementation disclosed herein includes incorporating into the signal distribution network a system that includes an Antenna Monitoring Unit (AMU) 645 coupled or connected to the output port of the signal source 601 in one end, and coupled or connected to a passive distributed antenna system 661 on the other end terminated with antennas 627. The antennas 627 transmit and receive signals from a target area (where terminal units are deployed or present). In one implementation, the AMU 645 may include one microcontroller based unit that functions as the intelligent component of the AMU 645. The AMU 645 may also include an RFID transceiver or interrogator that is managed by the microcontrolled unit to send queries or interrogation signals to, and receives responses from, the RFID tags attached to the antennas (FIG. 8). The AMU 645 may also include an RF coupler that couples the RF connector from the RFID transceiver/interrogator to the RF output connector (to the distribution system) of the AMU 645. The AMU 645 has a low loss RF path that connects in one end with the signal source 601 and the other end to the distribution system 661, so the RF signals from/to the signal source 601 pass through that RF path of the AMU 645 such that the AMU 645 can couple the RFID signals to be sent to the distribution system along with the RF signals from the signal source 601.

Figure 7:
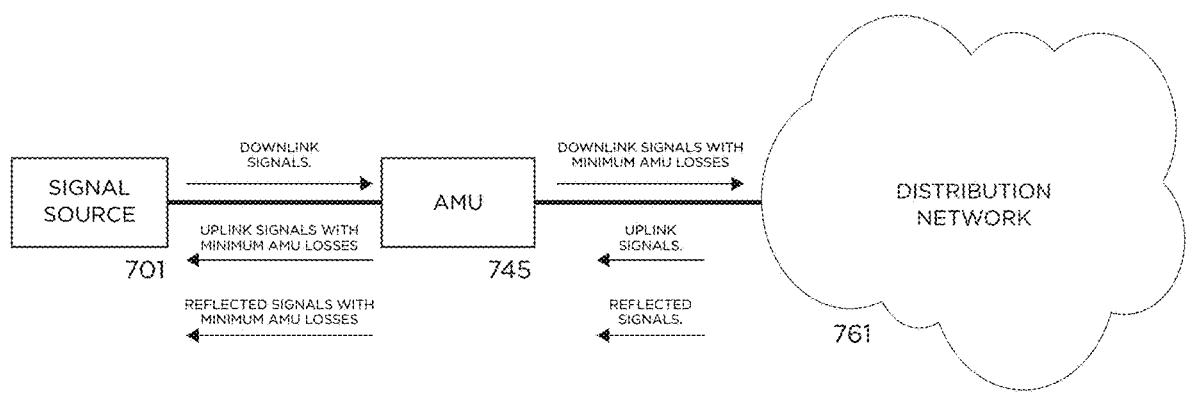
FIG. 7 illustrates a radio communication system with an antenna monitoring unit connected in between a signal source and a signal distribution network in accordance with one exemplary implementation of the disclosure.

Referring to FIG. 7, the AMU 745, by being connected in between the signal source 701 and the passive distributed antenna system 761, provides the ability of allowing the signal from the signal source 701 to experience minimal attenuation (as they pass through the AMU 745) both in the Downlink direction, in the Uplink direction, and also in the reflected direction (an Uplink direction based on the Downlink signal being reflected due to mismatches or other reasons).

FIG. 8 illustrates a radio communication system with passive distributed antenna system terminated with antennas with RFID patch receptors (e.g., RFID tag with an adhesive) in accordance with one exemplary implementation of the disclosure. Referring to FIG. 8, Radio Frequency Identification (RFID) patch receptors are placed at each indoor antenna 872a-n of the indoor passive distributed antenna system 861.

Figure 9:
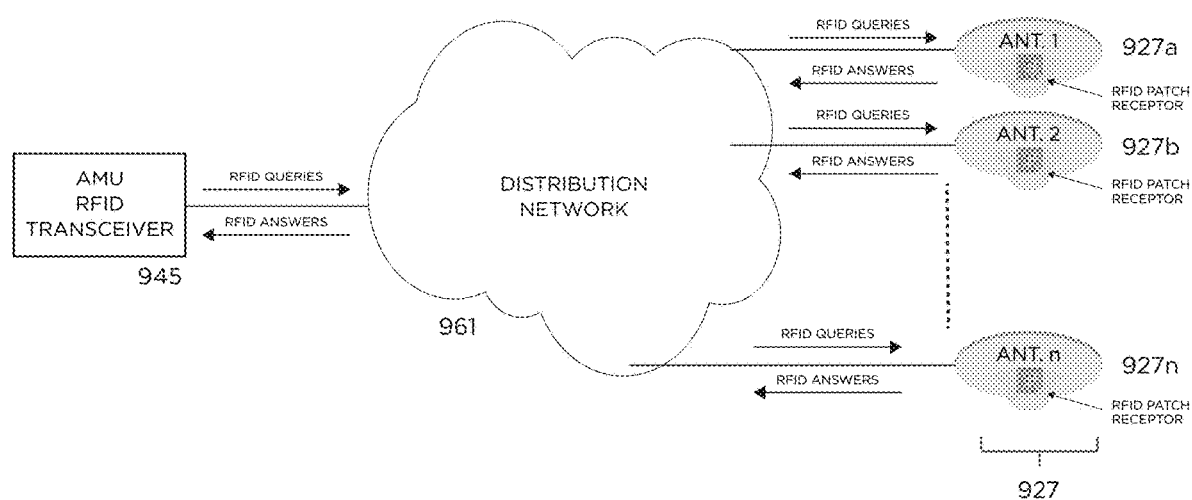
FIG. 9 illustrates a radio communication system with an antenna monitoring unit, and a passive distributed antenna system terminated with antennas with RFID patch receptors in accordance with one exemplary implementation of the disclosure.

FIG. 9 illustrates a radio communication system with an antenna monitoring unit 945, and a passive distributed antenna system 961 terminated with antennas 927 with RFID patch receptors in accordance with one exemplary implementation of the disclosure. Referring to FIG. 9, The AMU 945 has an RFID transceiver coupled to the output port of the AMU 945 towards the indoor passive distributed antenna system 961. The RFID transceiver may operate in one or more frequency bands, and the AMU 945 may transmit, through use of the RFID transceivers, queries via a radiofrequency signal towards one or all the RFID patch receptors located at each indoor antenna 927a-n of the passive distributed antenna system 961 through the same passive distributed structure, and receives back the response of each of the RFID patch receptors placed on each indoor antenna. In one implementation, the RFID interrogator and tags may exchange FSK modulated signals in the 900 MHz band, which is a frequency band supported by many if not all distribution networks used at indoor installations, which means that the RFID signals can easily propagate back and forth through the distribution network with minimum attenuation and/or signal degradation.

The AMU 945 collects the information contained in the responses received by each RFID patch receptor. The AMU 945 may include a database with the information of all the RFID patch receptors attached to any or all the indoor antennas and use the information of that database to compare with the received information of each RFID patch receptor.

Typically an RFID transceiver sends queries to all the RFID patches which scatters or transmits the RFID patch serial number back to the RFID transceiver. The RFID transceiver also receives information from the RFID tags about the power level of the interrogation signal that each RFID tag receives from the RFID transceiver of the AMU. The AMU has the ability to compare all the received serial numbers of the RFID tags with registered serial numbers. A registered serial number of an RFID tag can be the serial number entered into the database of the AMU by the system administrator or that was registered the first time when the radio signal distribution system was first installed. The AMU compares the received serial number information with the registered serial numbers to ascertain whether there are any RFID tags that are not responsive, which means that an RFID patch or corresponding antenna 627 associated with the patch is not connected, indicating a system failure. By not detecting the RFID tag, the AMU can generate a warning indicating that the antenna to which the RFID tag is attached (as opposed to the RFID tag antenna) has been removed (e.g., someone might have removed the antenna), which could mean that a portion of the indoor coverage area is not being served. If a person locates the antenna that has presumably been removed but finds the antenna in its proper location, then the warning generated by the AMU would still be useful as an indication that the RFID tag attached to that antenna needs to be replaced.

The AMU may also compare the power level of the RFID interrogation signal that the RFID patch receives from the RFID transceiver of the AMU with a threshold value, and if there is a difference detected between those power level values, then the AMU can generate a warning to indicate that the RFID interrogation signal travelling through the distribution network has suffered a higher or lower attenuation than expected, meaning that something has changed in the distribution network in term of losses, which in turn signifies that the signals from the signal source have suffered losses as they propagate through the indoor communication system, affecting the radio coverage inside the target coverage area. If the distribution network experiences increased signal loss (for example is a coaxial cable becomes damaged, or someone accidentally partially unscrews an RF connector of the distribution network, among other causes) then the radiation inside the indoor area will be less, reducing the coverage, which is considered as a system failure.

By comparing the received information of each RFID patch receptor with the information stored in its database, the AMU 945 can determine if all RFID patch receptors are sending their responses back to the AMU 945 after the AMU 945 sends a query or interrogation signal. Any indication that an RFID patch receptor is not responding back to the AMU 945 may be interpreted as the absence of that RFID patch receptor of the antenna in which the RFID was placed. By comparing the RF signal amplitude of the received signal for each RFID patch receptor, with the information about acceptable levels of RFID power levels stored in its database, the AMU 945 is able to determine if any amplitude variation has occurred, interpreting that any variation means a variation of the losses associated with the passive distribution network composed by coaxial cables and power distribution devices such as couplers and splitters, and in turn any variation detected may mean a variation of the performance of the indoor distributed antenna system.

Figure 10:
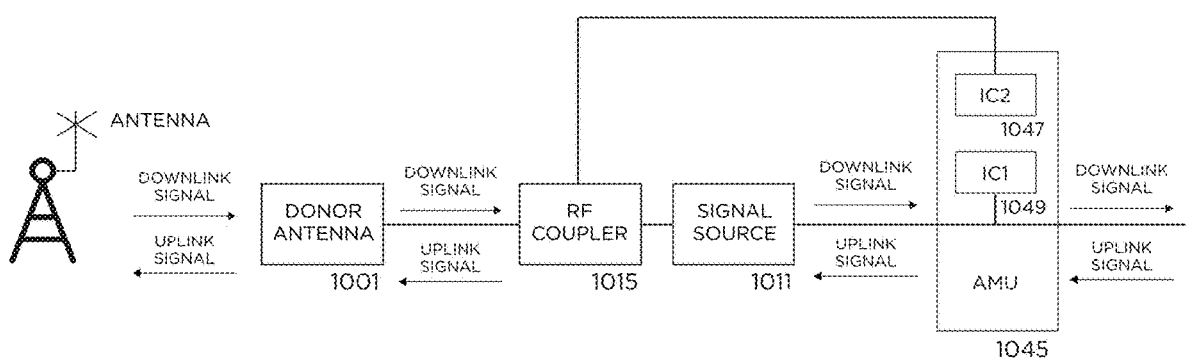
FIG. 10 illustrates a radio communication system with an antenna monitoring unit including two integrated circuits in accordance with one exemplary implementation of the disclosure.

Referring to FIG. 10, the AMU 1045 may include a first integrated circuitry 1049 (IC1) to perform spectrum analysis (SA) in either the down link (DL) and/or uplink (UL) direction from the signal source 1011 towards the indoor antennas and back (spectrum analysis of the signals coming from the signal source 1011, or the signals coming from the antennas). The IC1 1049 may measure spectrum parameters such as, but not limited to, broadband power levels, specific bandwidth power levels, noise levels in broadband and specific power levels, among others, in order to provide the AMU 1045 with specific spectrum information as requested by the AMU 1045 and/or End User (user of the system) where UL signals can originate from any terminal unit (TU) or any other signal from a signal source that can be received by any indoor antenna.

Referring to FIG. 10, the signal source 1011 may be implemented as a signal booster that receives downlink (DL) signals from a remote base station via the donor antenna 1001, amplifies the DL signals and transmits them to the TUs located within the indoor area via the service antennas. The signal source 1011 also receives the uplink (UL) signals from the TUs within the indoor area via the service antennas (and through the distribution network), amplifies them and transmits them back to the remote base station through the donor antenna 1001.

The AMU 1045 may include a second integrated circuitry 1047 (IC2) to perform spectrum analysis (SA) in either DL and/or UL direction from the signal source 1011 towards the donor antenna and back (spectrum analysis of the signals coming from the signal source 1011, or the signals coming from the antennas), using a radiofrequency coupling device 1015 (RF COUPLER), such as a coupler, a tap or any other passive or active device. The IC2 1047 may measure spectrum parameters such as, but not limited to, broadband power levels, specific bandwidth power levels, noise levels in broadband and specific power levels, among others, in order to provide the AMU 1045 with specific spectrum information as requested by the AMU 1045 and/or End User (user of the system).

The IC2 1047 may be used to analyze what goes on in terms of RF signals coming in to or being received by the signal source 1011 (a signal booster for example as indicated above) from the donor antenna 1001 in the DL direction, and to measure the RF signals output by the signal source in the UL direction towards the donor antenna 1001. The IC2 1047 measures those signals via the coupler 1015 (the coupler directs a representative portion of those DL and UL signals to the IC2 1047) so that the IC2 1047 can perform spectrum analysis. The IC 1047 may constantly monitor the RF levels at the remote base station—signal source side, to analyze for example any change in the DL signals being received at the signal source 1011 via de donor antenna 1001. If the DL signal source power level is reduced, it would mean that the base station has experienced changes or the donor antenna has experienced changes in their operating condition (e.g., a strong wind may have moved the donor antenna and now it is pointing to another direction, or the antenna may have felled or become disconnected) and those changes in operating conditions affect the DL input signals at the signal source 1011. The DL signal variations detected through the IC2 1047 may end up affecting the DL signals radiated to the indoor location or target area, changing the indoor DL coverage.

With respect to the UL side, the IC2 1047 measures the UL signals coming out of the signal source 1011 (or signal booster for example) and by comparison can detect if the UL signals at the output of the signal source have a lower level than previously detected, which would indicate that the signal source 1011 is not working properly, and that the communication within the radio communication system will be affected because poor or no UL signals that can reach the remote base station.

In one implementation, by comparing the spectral analysis produced by IC1 1049 and IC2 1047, the AMU 1045 can observe the operation or behavior of the signal source 1011 in the "DL in" and "DL out" levels and determine if the signal source gain is proper. Likewise, by having the AMU 1045 measure the "UL in" signals at IC1 1049 and "UL out" signals al IC2 1047 and analyzing the two by comparison, the AMU 1045 can determine the UL gain of the signal source 1011. By taking these measurements over time, the AMU 1045 can determine whether the signal source 1011 is working properly.

The foregoing description of possible implementations consistent with the present disclosure does not represent a list of all such implementations or all variations of the implementations described. The description of some implementations should not be construed as an intent to exclude other implementations described. For example, artisans will understand how to implement the disclosed embodiments in many other ways, using equivalents and alternatives that do not depart from the scope of the disclosure. Moreover, unless indicated to the contrary in the preceding description, no particular component described in the implementations is essential to the invention. It is thus intended that the embodiments disclosed in the specification be considered illustrative, with a true scope and spirit of invention being indicated by the following claims. Further, the limitations of the following claims are not written in means--plus-function format and are not intended to be interpreted based on 35 U.S.C. 112(f), unless and until such claim limitations expressly use the phrase "means for" followed by a statement of function void of further structure.

The invention claimed is:

1. A communication system comprising:
   a signal source for transmitting downlink signals and receiving uplink signals to and from an indoor signal coverage area;
   a distributed antenna system interposed between the signal source and the indoor signal coverage area, said distributed antenna system comprising an antenna monitoring unit connected to at least one service antenna through a distribution network; wherein said at least one antenna transmits and receives the downlink signals and the uplink signals to and from at least one terminal unit within the indoor coverage area;
   wherein the antenna monitoring unit includes an RFID transceiver that communicates with at least one RFID tag attached to said at least one antenna and detects the location of point of anomaly with respect to that one antenna when a signal from said at least one RFID tag is not received by the RFID transceiver or when a power level measured by the RFID tag and reported back to the RFID transceiver falls below a predetermined threshold level;
   wherein the antenna monitoring unit includes a first integrated circuitry to perform spectrum analysis in either the down link and/or uplink direction from the signal source towards the at least one antenna; and to perform spectrum analysis in either the down link and/or uplink direction from the at least one antenna towards the signal source;
   the system further comprising a coupling device interposed between the signal source and a donor antenna, and wherein the antenna monitoring unit includes a second integrated circuitry that is connected to and uses the coupling device to perform spectrum analysis in either the down link and/or uplink direction from the signal source towards the donor antenna; and to perform spectrum analysis in either the down link and/or uplink direction from the donor antenna towards the signal source.

2. The system of claim 1, wherein the second integrated circuitry measures spectrum parameters that include one or more of broadband power levels, specific bandwidth power levels, noise levels in broadband and specific power levels.

3. The system of claim 1, wherein the antenna monitoring unit compares the spectral analysis of the first and second integrated circuitries to determine whether the gain of the signal source is appropriate.

4. The system of claim 3, wherein the antenna monitoring unit keeps a record of spectral parameters generated by the spectral analysis of the first and second integrated circuitries over time to determine whether the signal source is operating properly.

* * * * *